United States Patent [19]

Baisch

[11] 4,005,310
[45] Jan. 25, 1977

[54] ELECTRICALLY HEATED GRAVY WARMING LADLE

[76] Inventor: Thelma E. Baisch, P.O. Box 615, Whittier, Calif. 90608

[22] Filed: Mar. 7, 1975

[21] Appl. No.: 556,563

Related U.S. Application Data

[62] Division of Ser. No. 426,820, Dec. 20, 1973, Pat. No. 3,886,345.

[52] U.S. Cl. .................. 219/227; 30/140; 30/324; 219/523; 219/533; 425/282
[51] Int. Cl.² .................. H05B 1/00; A47J 43/28; H05B 3/80
[58] Field of Search .......... 219/523, 533, 437, 221, 219/227–231, 236–240; 30/140, 324; 425/276–282

[56] References Cited

UNITED STATES PATENTS

| | | | |
|---|---|---|---|
| 1,255,906 | 2/1918 | Miller | 425/282 X |
| 1,323,523 | 12/1919 | Cox | 219/227 UX |
| 1,732,502 | 10/1929 | Cox | 219/228 UX |
| 1,971,577 | 8/1924 | Parker | 219/228 X |
| 1,974,051 | 9/1934 | Kelly | 219/228 X |
| 2,114,703 | 4/1938 | Commer | 219/227 X |
| 2,166,810 | 7/1939 | Gammeter | 425/277 |
| 2,256,770 | 9/1941 | Armstrong | 219/228 X |
| 2,260,689 | 10/1941 | Miller | 219/228 X |
| 3,325,627 | 6/1967 | Adler et al. | 219/227 |
| 3,513,290 | 5/1970 | Burley et al. | 219/227 X |
| 3,886,345 | 5/1975 | Baisch | 219/227 |

FOREIGN PATENTS OR APPLICATIONS

| | | | |
|---|---|---|---|
| 349,279 | 2/1922 | Germany | 219/523 |
| 813,288 | 9/1951 | Germany | 219/228 |

Primary Examiner—A. Bartis
Attorney, Agent, or Firm—J. C. Baisch

[57] ABSTRACT

A gravy warming ladle has a bowl comprising a pair of concavo-convex shell-like upper and lower parts with the upper part received within and having its bottom spaced from the lower part to form a hollow cavity therebetween that tapers from a maximum size at the center to a minimum size at the edges and with the edges of the parts being united in a thin free edge. An electric heating element is disposed in a mass of asbestos heat storing insulation filling the cavity. A tubular handle is attached to a neck on the bowl formed by fitted-together semi-cylindrical projections on the upper and lower parts. Current supply wires extend through the handle and are connected to the heating element at the neck portion. Insulating blocks in the neck portion insure proper insulation of the connections between the wires and heating element.

3 Claims, 5 Drawing Figures

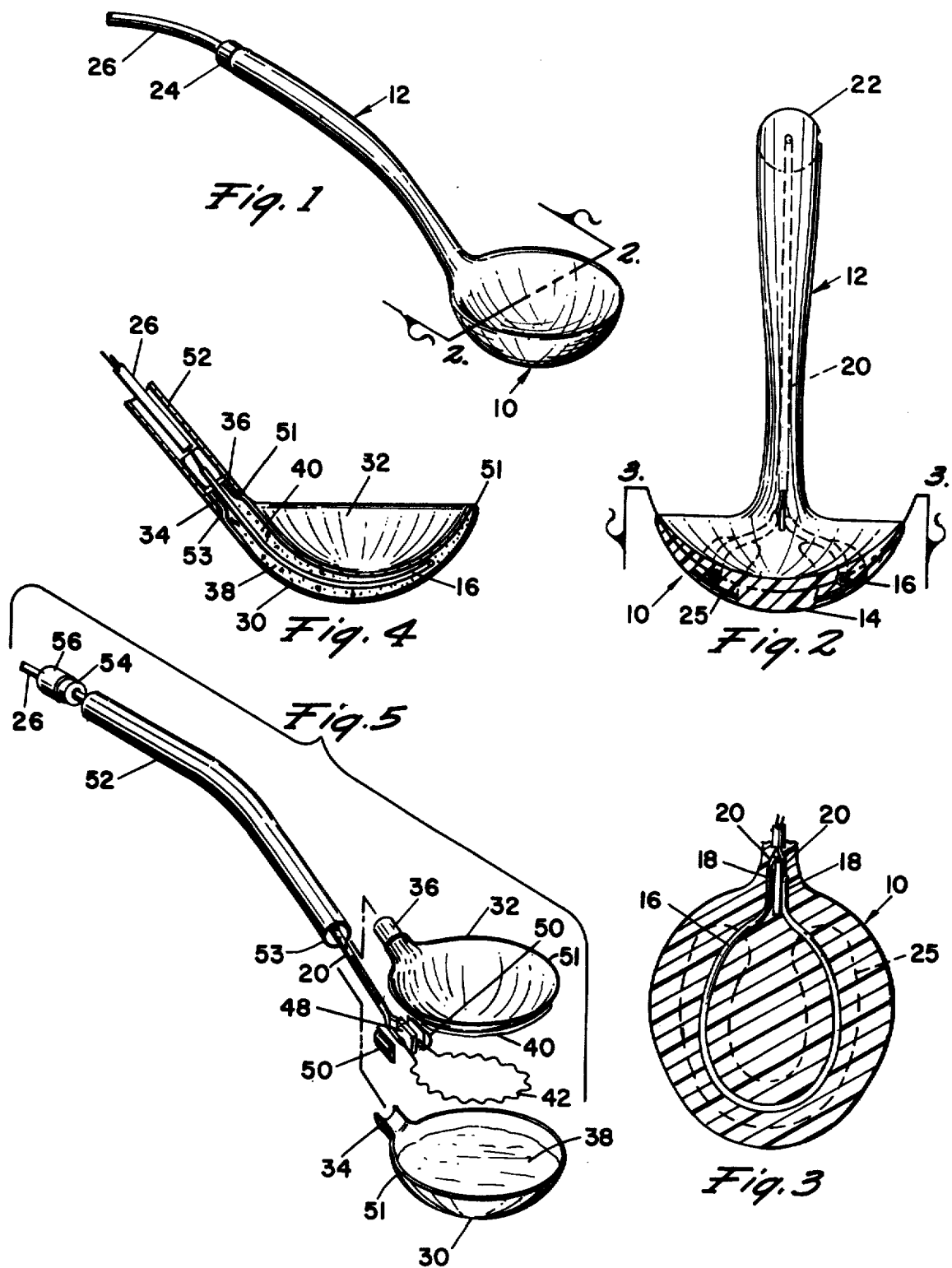

ELECTRICALLY HEATED GRAVY WARMING LADLE

CROSS-REFERENCE TO RELATED APPLICATION

Division of Applicant's co-pending application for ELECTRICALLY HEATED GRAVY WARMING LADLE, Serial No. 426,820 filed December 20, 1973 now U.S. Pat. No. 3,886,345. Date of grant: May 27, 1975.

BACKGROUND OF THE INVENTION

1. Field of the Invention.

This invention relates generally to silverware and relates more particularly to ladles and the like for warming gravy or other such ingredients in a bowl in which such ingredients are served.

SUMMARY OF THE INVENTION

The invention comprises a ladle having a bowl at one end of a handle. An electric heating element is embedded or positioned within the bowl and electric wires operably connected to the heating element extend through a passage in the handle and are connected to an electric socket at the free end of the handle.

In one arrangement, the heating element comprises a heating rod (one form of which is commercially known as a "calrod"). In another arrangement, the heating coil element comprises a resistance coil embedded in insulating material such as asbestos for example.

After the bowl has been heated, it will provide some retained heat after the electric current is cut off from the heating element or coil. An additional supply of retained heat is also provided by the rod type of heating element after the electric current is shut off from the heating element. Such a supply of retained heat is also supplied by the asbestos when it has been heated. A further additional supply of retained heat is provided by an insert which becomes heated when the heating elements are operating.

By having the retained heat, the gravy or the like will be kept warm for a while after the heating elements have been turned off and thus the ladle may be disconnected from the electric cord for using it to serve the gravy and will extend the time the device will keep warm the gravy in which the device is disposed.

OBJECTS AND ADVANTAGES OF THE INVENTION

It is an object of the present invention to provide an electrically heated ladle for use in bowls or boats for gravy or similar ingredients to keep the gravy or other ingredients warm.

Another object of the invention is to provide a ladle of this character to keep gravy or similar ingredients warm when served at the table.

Still another object is to provide a device of this character having heat retaining or storing means which will supply heat to the material being warmed after the electric heating elements are turned off, such heat retaining or storing means being electrical insulating material.

A further object of the invention is to provide a device of this character that is simple in construction and relatively inexpensive to manufacture.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a perspective view of a ladle embodying the present invention;

FIG. 2 is a sectional view taken on line 2—2 of FIG. 1;

FIG. 3 is a sectional view taken on line 3—3 of FIG. 2;

FIG. 4 is a partial longitudinal sectional view of an alternative arrangement; and FIG. 5 is an exploded view of another alternative arrangement.

DESCRIPTION OF THE PREFERRED EMBODIMENTS

Referring to FIGS. 1, 2 and 3, there is shown a ladle embodying the invention and having a bowl 10 and a handle 12.

Bowl 10 is shown as being of plastic and is thicker at the bottom portion 14. Embedded in the thicker portion of the bowl is a heating element 16 shown as being a rod type such as a heating rod. The ends 18 of the heating element are located adjacent the part of the bowl from which the handle 12 extends and electric wires 20 are attached to the ends of said heating element. These wires extend through the handle and their outer ends are connected to an electric socket 22 within the handle and at its outer end, said socket being adapted to receive an electric plug of the usual character.

Plug 24 is connected to a suitable source of electric power by means of an electric cord 26.

While the bowl and the rod type of heating element retains heat after being heated for prolonging the warming gravy or other elements after the electric current has been cut off, an insert 25 is also provided which is heated by the heating element and which will store or retain heat which will be given off after the device is turned off. This insert may be of any suitable character but is shown in FIG. 2 as being of metal. It may be disposed adjacent to or, as shown, in FIG. 2, in usual contact with the rod 16.

The bowl and handle of the device are shown as being of plastic and any suitable well-known type of plastic may be used that is resistant to temperatures such as would be required to keep the gravy or similar ingredients suitably warm.

As shown, the bowl and handle are molded, cast or otherwise formed integrally with the heating element 16, wires 20 and socket 22 embedded in the bowl and handle when formed. It is to be understood, of course, that the bowl and handle may be of metal or other material that may be cast, molded or otherwise suitably formed and where necessary, the heating element 16 may be suitably insulated from the metal when the device is made of metal.

Referring to FIGS. 4 and 5, there is shown an alternative arrangement wherein the bowl is shown as being of metal and formed of two concavo-convex shell-like parts, a bottom part 30 and a top or upper part 32, the handle also being of metal and is tubular. The upper part 32 is received within the lower part, said parts being spaced to form a hollow cavity therebetween that tapers from a maximum size at the center to a minimum size at the edges, the edges being united in a relatively thin free edge. Respective parts of the bowl are provided with extensions 34 and 36, said extensions being semi-cylindrical and when the parts of the bowl are placed together with the upper part 32 received within the lower part 30, the extensions together form a tubular part that may be termed a neck which is received within the adjacent end of the handle thereby connecting the handle to the bowl. The interior of the lower part of the bowl is provided with a layer of insulating material 38 which may be of asbestos or other suitable material. The underside of the upper part 32 of the bowl is also provided with similar insulating material 40.

The asbestos or other suitable insulating material will also store up heat when the heating element is energized. This stored up heat or retained heat will also provide heat to keep the gravy or the like warm after the heating element is turned off.

It is also to be understood that an insert such as insert 25 may be incorporated in the arrangement of FIG. 4 for additional retained heat after the heating element is turned off.

The electric heating element 16 preferably is disposed between the layers of insulating material 38 and 40. Each end of the heating element 16 is connected to wires 20 of an electric cord 26 and between the ends of the heating element 16 where the wires 20 are connected is a piece of electrical insulating material 48 while at each side of said ends of the heating element and the connection of the wires are pieces of insulating material 50 which are flat at their inner sides and rounded exteriorly for reception in the neck defined by extensions 34 and 36.

In the embodiment of FIGS. 4 and 5, the handle indicated at 52, is tubular and the forward end thereof fits over the neck of the bowl thereby securing the insulating pieces 48 and 50 securely in position. Electric cord 26 extends through the handle and the wires thereof are operably connected to an electric socket 54 which when the device is assembled is secured in the free end of the handle 52. Socket 54 is adapted to receive an electric plug 56 adapted to be connected to a suitable source of electric power by the cord 26.

The parts of the bowl are secured together by means of brazing, soldering or the like along adjacent edges such as at 51. The handle is also soldered to the parts of the bowl at 53 and the insulating pieces 48 and 50 are thereby securely held in position within the neck. The bowl and handle may be of any suitable metal such as for example stainless steel or silver. A heat insulating cover not shown may be secured on the handle.

In this arrangement, the thickness of the lower and upper parts of the bowl is substantially uniform but there must be sufficient space allowed between the said upper and lower parts of the bowl to accommodate the heating element and any insulating materials therefor that may be used.

It is to be understood that the heating elements of the invention need not produce a high temperature but such temperature as is sufficient to keep the gravy or similar ingredients pleasingly warm.

The arrangement of FIG. 5 is substantially the same as that of FIG. 4 except that the heating element is a resistance coil indicated at 42. Suitable electrical insulating material must, of course, be used for the resistance coil although under some conditions, an enameled wire may be used.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:
1. A ladle, comprising:
a bowl formed by
a pair of concavo-convex shell-like upper and lower parts, with the upper part received within the lower part, the bottoms of said parts being spaced from each other and shaped to form a hollow cavity therebetween that tapers from a maximum size at the center to a minimum size at the edges, said edges being united in a relatively thin free edge;
a handle secured to said bowl for manipulation thereof, said handle being inclined upwardly from said bowl;
an electric heating element in the space between said upper and lower shell-like parts of the bowl;
heat storing insulation for the heating element between said upper and lower shell-like parts and filling the space between said parts;
means for connecting the electric heating element to a source of electricity;
the heat storing insulation comprising electrical insulating material;
said electrical insulating material being asbestos;
each of the parts of the bowl having a projection semi-cylindrical in cross section, said projections fitting together to form a neck extending from the bowl and wherein the handle is tubular with the end adjacent the bowl receiving said neck and being secured thereto.

2. A ladle, comprising:
a bowl formed by
a concavo-convex of concave-convex shell-like upper and lower parts, with the upper part received within the lower part, the bottoms of said parts being spaced from each other and the free edges of said parts being united in a relatively thin edge;
a handle secured to said bowl, said handle being inclined upwardly from said bowl;
an electric heating element in the space between said upper and lower shell-like parts of the bowl;
heat storing insulation for the heating element between said upper and lower shell-like parts and filling the space between said parts;
means for connecting the electric heating element to a source of electricity,
the heat storing insulation comprising electrical insulating material;
said electrical insulating material being asbestos;
each of the parts of the bowl having a projection semi-circular in cross-section together forming a neck extending from the bowl and wherein the handle is tubular with the end adjacent the bowl receiving said neck and being secured thereto;

there being electric wires which comprise the means for connecting the heating element to a source of electricity, said wires being connected to the respective ends of the heating element and there are insulating blocks at the location of the connections between the wires and the connected ends of the heating element, there being a block between the respective ends of the wires and the heating element and blocks at each side thereof, the insulating blocks conforming to and filling the neck of the bowl.

3. A ladle, comprising:

a bowl formed by a pair of concavo-convex shell-like upper and lower parts, with the upper part received within the lower part, the bottoms of said parts being spaced from each other and the free edges of said parts being united in a relatively thin edge;

each of the parts of the bowl having a projection arcuate in cross-section together forming a neck extending from the bowls;

a handle secured to the neck of said bowl for manipulation thereof, said handle being inclined upwardly from said bowl;

an electric heating element in the space between the upper and lower shell-like parts of the bowl;

heat storing insulation for the heating element between said upper and lower shell-like parts and filling the space between said parts;

means for connecting the electric heating element to a source of electricity;

said means comprising electric wires having ends connected to the respective ends of the heating element;

and insulating blocks at the location of the connections between the wires and the connected ends of the heating element, there being a block between the respective ends of the wires and the heating element and blocks at each side thereof, the insulating blocks conforming to and filling the neck of the bowl.

* * * * *